(12) United States Patent
Liikanen et al.

(10) Patent No.: US 7,019,937 B1
(45) Date of Patent: Mar. 28, 2006

(54) METHOD AND APPARATUS FOR DETERMINING A TRANSDUCER'S REFERENCE POSITION IN A DISK DRIVE HAVING A DISK SURFACE WITH SPIRAL SERVO INFORMATION WRITTEN THEREON

(75) Inventors: Bruce Liikanen, Berthoud, CO (US); John VanLaanen, Louisville, CO (US); Steve Ward, Louisville, CO (US)

(73) Assignee: Maxtor Corporation, Longmont, CO (US)

( * ) Notice: Subject to any disclaimer, the term of this patent is extended or adjusted under 35 U.S.C. 154(b) by 43 days.

(21) Appl. No.: 10/858,839

(22) Filed: Jun. 2, 2004

Related U.S. Application Data

(60) Provisional application No. 60/475,098, filed on Jun. 2, 2003.

(51) Int. Cl.
 *G11B 5/596* (2006.01)
 *G11B 21/02* (2006.01)

(52) U.S. Cl. .................... 360/77.11; 360/75; 360/77.07
(58) Field of Classification Search ............... 360/75, 360/77.07, 77.11, 51, 77.08, 77.04, 77.02, 360/78.04; 369/44.29, 43, 44.34, 44.35, 111, 369/44.26, 53.29
See application file for complete search history.

(56) References Cited

U.S. PATENT DOCUMENTS

| | | | | |
|---|---|---|---|---|
| 5,668,679 A | * | 9/1997 | Swearingen et al. | 360/75 |
| 6,144,517 A | * | 11/2000 | Watanabe et al. | 360/77.04 |
| 6,704,156 B1 | * | 3/2004 | Baker et al. | 360/75 |

* cited by examiner

*Primary Examiner*—Andrew L. Sniezek
(74) *Attorney, Agent, or Firm*—Tejpal S. Hansra

(57) ABSTRACT

The present invention is directed to method and apparatus for determining a transducer's reference position in a disk drive having a disk surface with spiral servo information written thereon. The transducer comprises a read head for reading spiral servo information and a read signal envelope is generated when the read head reads the spiral servo information. An integration is performed over a first integration window, wherein the first integration window includes a read signal envelope. A reference position is determined for the read head using a second integration window (virtual integration window) that is included within, and smaller than, the first integration window. In one embodiment, the integration may be performed on a frame-by-frame basis. A determination may be made of the frame in the first integration window that includes a maximum sync amplitude. The second integration window may be centered using the frame that includes the maximum sync amplitude.

31 Claims, 10 Drawing Sheets

HALF_INT = (INTSUM(9) − INTSUM(3)) / 2 + INTSUM(3)

METHOD AND APPARATUS FOR DETERMINING A TRANSDUCER'S REFERENCE POSITION IN A DISK DRIVE HAVING A DISK SURFACE WITH SPIRAL SERVO INFORMATION WRITTEN THEREON

CROSS-REFERENCE TO RELATED APPLICATIONS

Priority is claimed from U.S. Provisional Patent Application Ser. No. 60/475,098 filed Jun. 2, 2003, which is incorporated herein by reference in its entirety.

FIELD OF THE INVENTION

The present invention relates generally to data storage devices, such as disk drives. More particularly, the present invention relates to a method and apparatus for providing a virtual integration window for demodulating spiral-written servo information written on a disk surface of a disk drive to provide transducer position.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$, generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24–40 are depicted in FIG. 6), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, STW Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein. The sync marks 702 constitute phase shifts within the spiral pattern. In FIG. 7, the sync marks 702 are shown as regularly-space white areas within the spiral 700.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half integrator value.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

To determine the time at which the half integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync to sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

FIG. 12 is a schematic representation of an integration window 1202 and a read signal envelope 1204. The integration window 1202 is opened around the expected position of the read signal envelope 1204. The dynamic range of the system is defined by the integration window's width 1206 minus the width 1208 of the read signal envelope 1204. The system reaches the limits of its dynamic range when the read signal envelope 1204 begins to move outside of the integration window 1202.

In FIG. 12, the read signal envelope 1204 is centered in the integration window 1202. In such case, the position error signal (PES) would be zero.

In certain instances, repeatable runout (RRO) may be introduced into the servo system. For example, RRO may be introduced when the write head is not moved at its expected velocity across the disk surface during the spiral writing process.

FIG. 13 is a schematic diagram illustrating an integration window 1202 and a read signal envelope 1204 that is shifted from the center of the integration window 1202 due to RRO 1310. As can be seen in FIG. 13, RRO 1310 can decrease the dynamic range over half of the integration window (i.e., the right-half of the integration window in FIG. 13).

Because it is inevitable that some RRO will be present (and for other reasons), it would be beneficial to increase the dynamic range of the system by increasing the size of the integration window (i.e., the period of time over which it is open). While increasing the size of the integration window will increase the dynamic range of the system, this will cause an increase in the noise of the system, which may lead to errors in determining the position of the reader.

Specifically, because the position of the reader is determined by integrating over the entire integration window and then dividing by 2, if the amount of noise within the integration window is not equal on either side of the read signal envelope, the read signal will appear to be shifted to one side or the other of the integration window. Hence, it will appear that the read head is shifted to one side or the other of the integration window, even though, in fact, it may be centered in the integration window.

FIG. 14A is a schematic illustration of a read signal envelope 1404 that is centered in the integration window 1402 (i.e. the PES should be zero). FIG. 14B is a schematic illustration of a curve representing accumulated integration values across the integration window. Because the noise is equal (i.e., zero) in the integration window on both sides of the read signal envelope, the half-integrator value will appropriately provide a position reference for the reader. However, it is very unlikely that the read signal envelope will be centered in the integration window and that the noise will be exactly equal in the integration window on both sides of the read signal envelope. Accordingly, even assuming that the noise level is constant (but not zero), the error in the half-integrator value will be a function of where the read signal envelope appears in the integration window.

Like FIG. 14A, FIG. 15A is a schematic illustration of a read signal envelope 1404 that is centered in an integration window 1402 (i.e. the PES should be zero). FIG. 15B is a schematic illustration of a curve representing accumulated integration values across the integration window. In this case, however, the noise is not equal on both sides of the read signal envelope. In fact, a larger amount of noise 1512 is present to the left of the read signal envelope 1404. Accordingly, the half-integrator value will improperly indicate that the read signal envelope is to the left of the center of the integration window, which will result in a PES that is different from zero. As the size of the integration window is increased, there is a greater likelihood that some unexpected noise or other remnant may be present in the integration window, which may lead to an error in determining the reference position of the reader (i.e., the half-integration value).

Accordingly, it would be beneficial to provide a method for increasing the dynamic range of the system without increasing the noise in the system.

SUMMARY OF THE INVENTION

The present invention is designed to meet some or all of the aforementioned, and other, needs.

The present invention is directed to method and apparatus for determining a transducer's reference position in a disk drive having a disk surface with spiral servo information written thereon. In one embodiment, the transducer comprises a read head for reading spiral servo information. A read signal envelope is generated when the read head reads the spiral servo information. An integration is performed over a first integration window, wherein the first integration window includes a read signal envelope. A reference position is determined for the read head using a second integration window (virtual integration window) that is included within, and smaller than, the first integration window.

In one embodiment, the integration may be performed on a frame-by-frame basis. A determination may be made of the frame in the first integration window that includes a maximum sync amplitude. The second integration window may be centered using the frame that includes the maximum sync amplitude.

Other embodiments, objects, features and advantages of the invention will be apparent from the following specification taken in conjunction with the following drawings.

DETAILED DESCRIPTION OF THE PREFERRED EMBODIMENT

Figure 1:
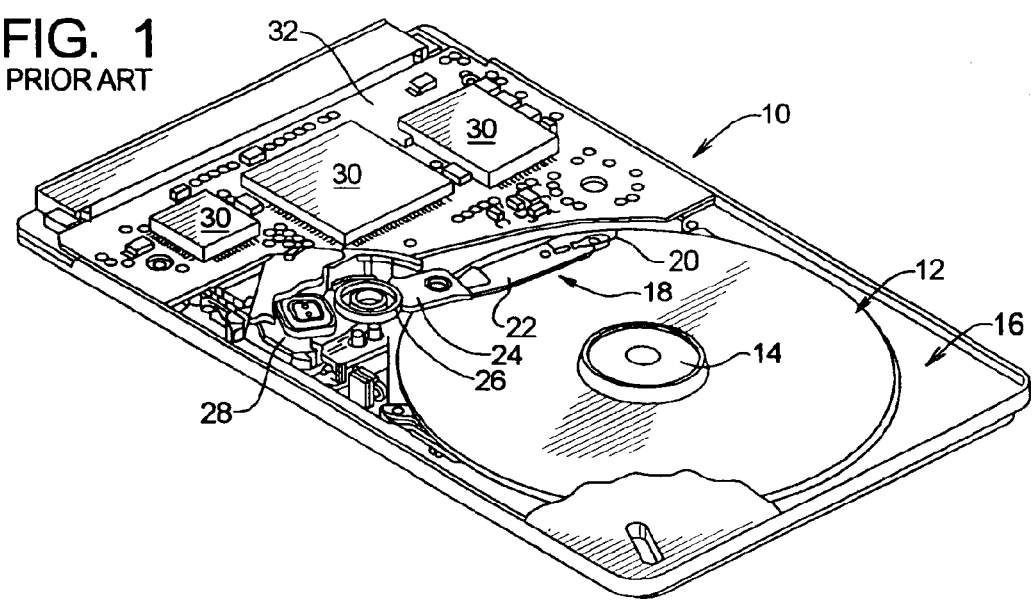
FIG. 1 is a diagrammatic representation illustrating a conventional disk drive with its top cover removed.
Figure 2:
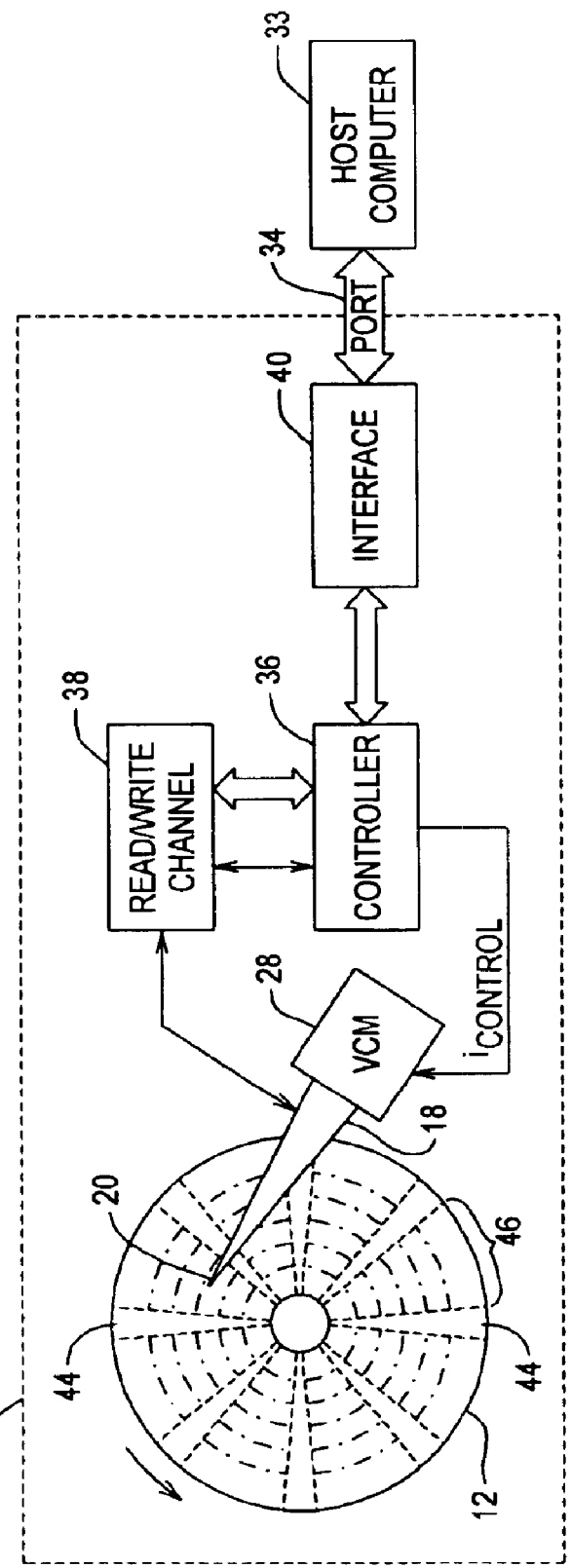
FIG. 2 is a functional block diagram which illustrates a conventional disk drive that is coupled to a host computer via an input/output port.
Figure 3:
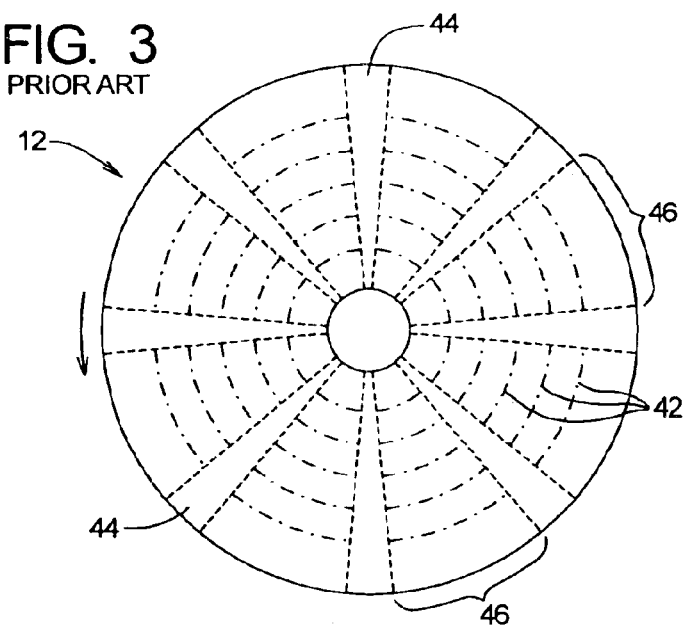
FIG. 3 is a diagrammatic representation of a top view of a magnetic storage disk illustrating a typical organization of data on a disk surface.
Figure 4:
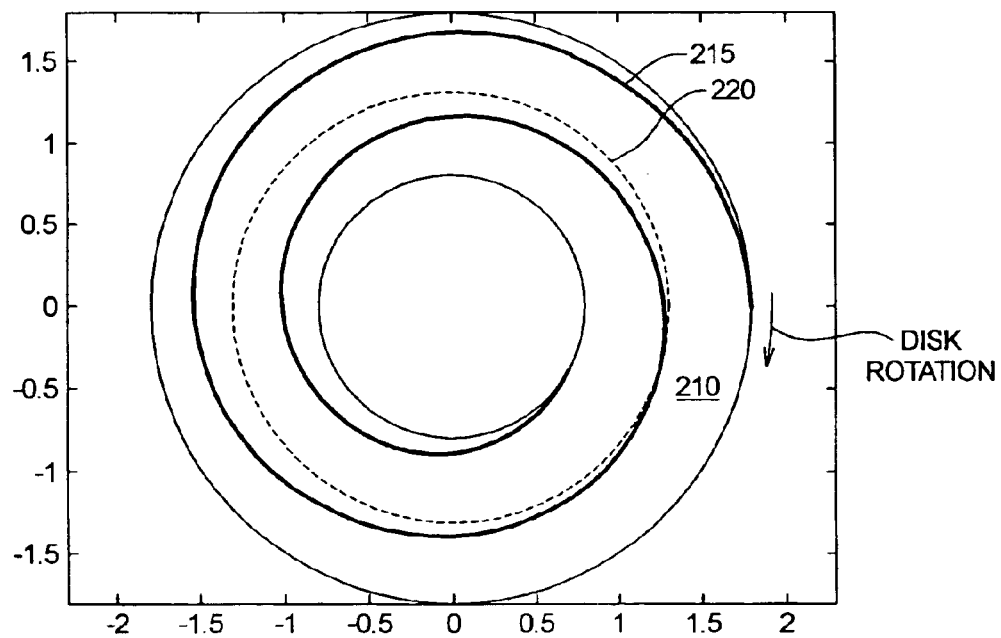
FIG. 4 is a diagrammatic representation of a disk surface having a spiral of servo information written thereon, along with a circular data storage track.
Figure 5:
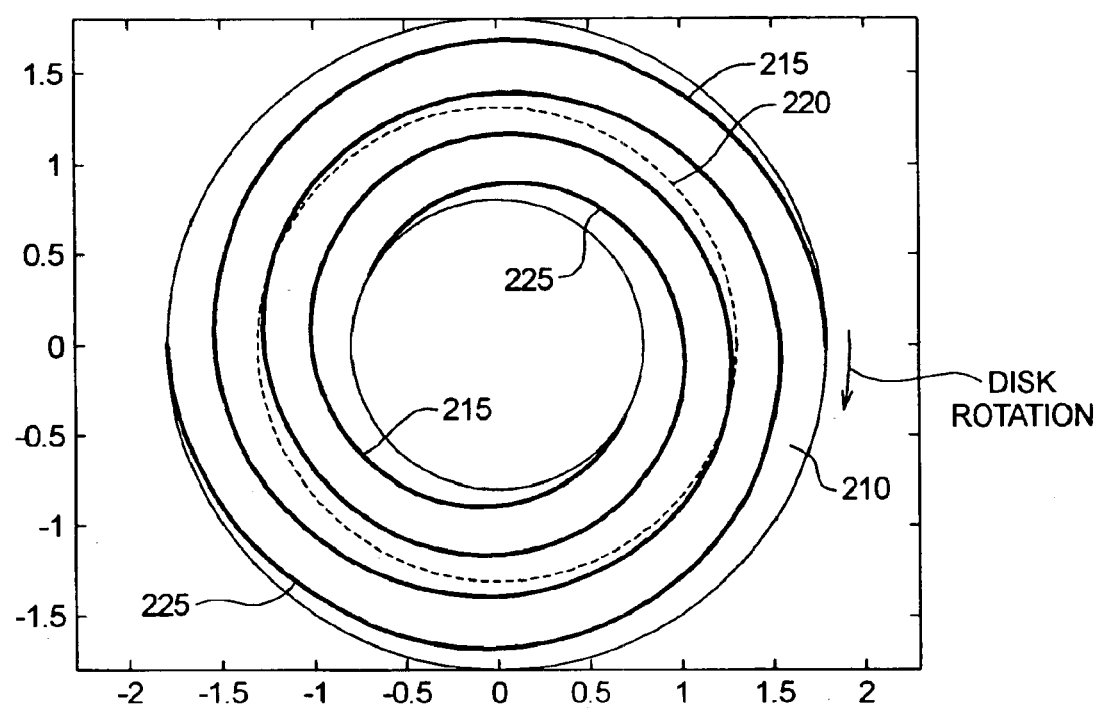
FIG. 5 is a diagrammatic representation of a disk surface having two spirals of servo information written thereon, along with a circular data storage track.
Figure 6:
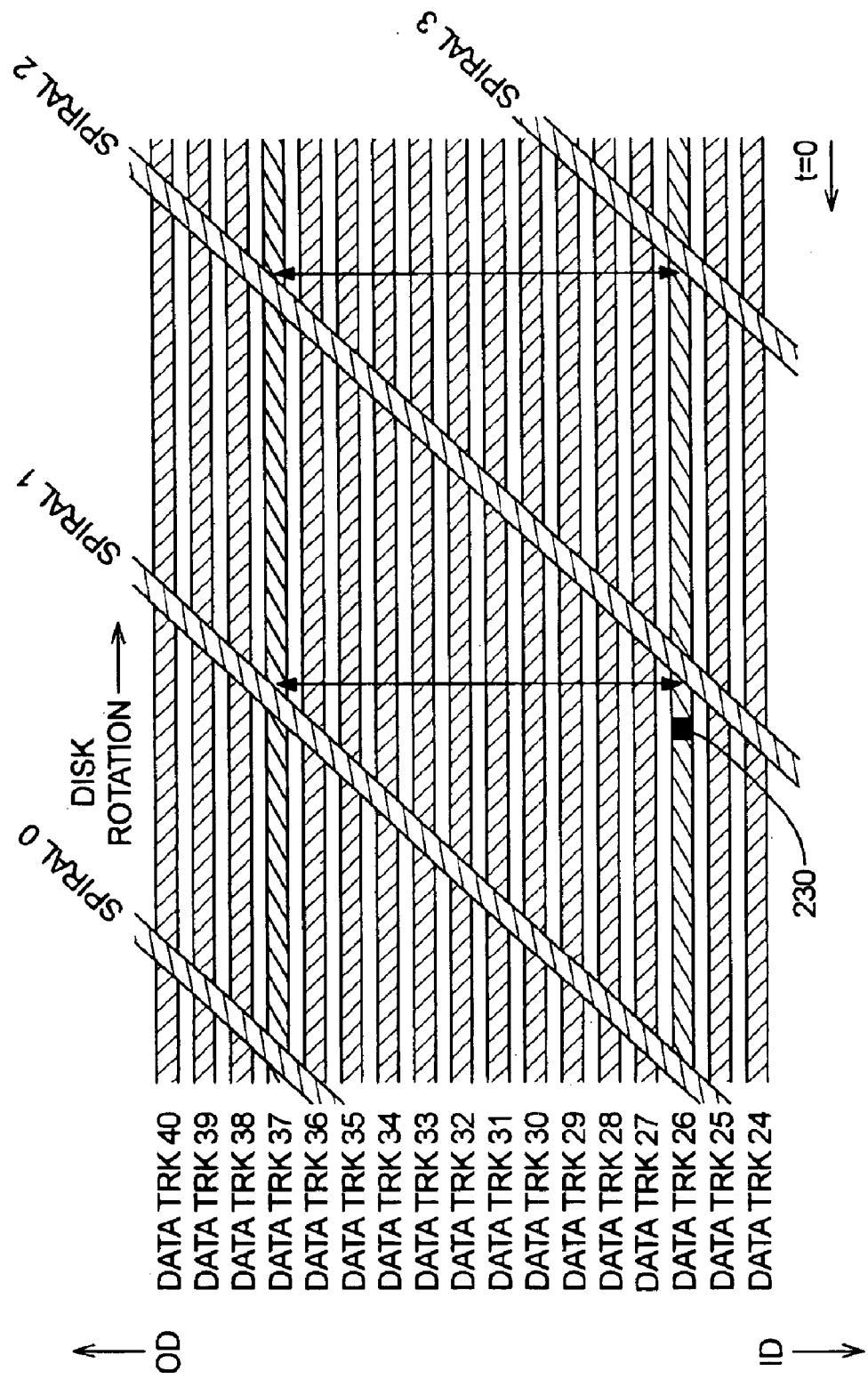
FIG. 6 is a diagrammatic representation of a magnified view of a portion of FIG. 5 showing additional spirals of servo information in a linear, instead of arcuate fashion, for ease of depiction.
Figure 7:
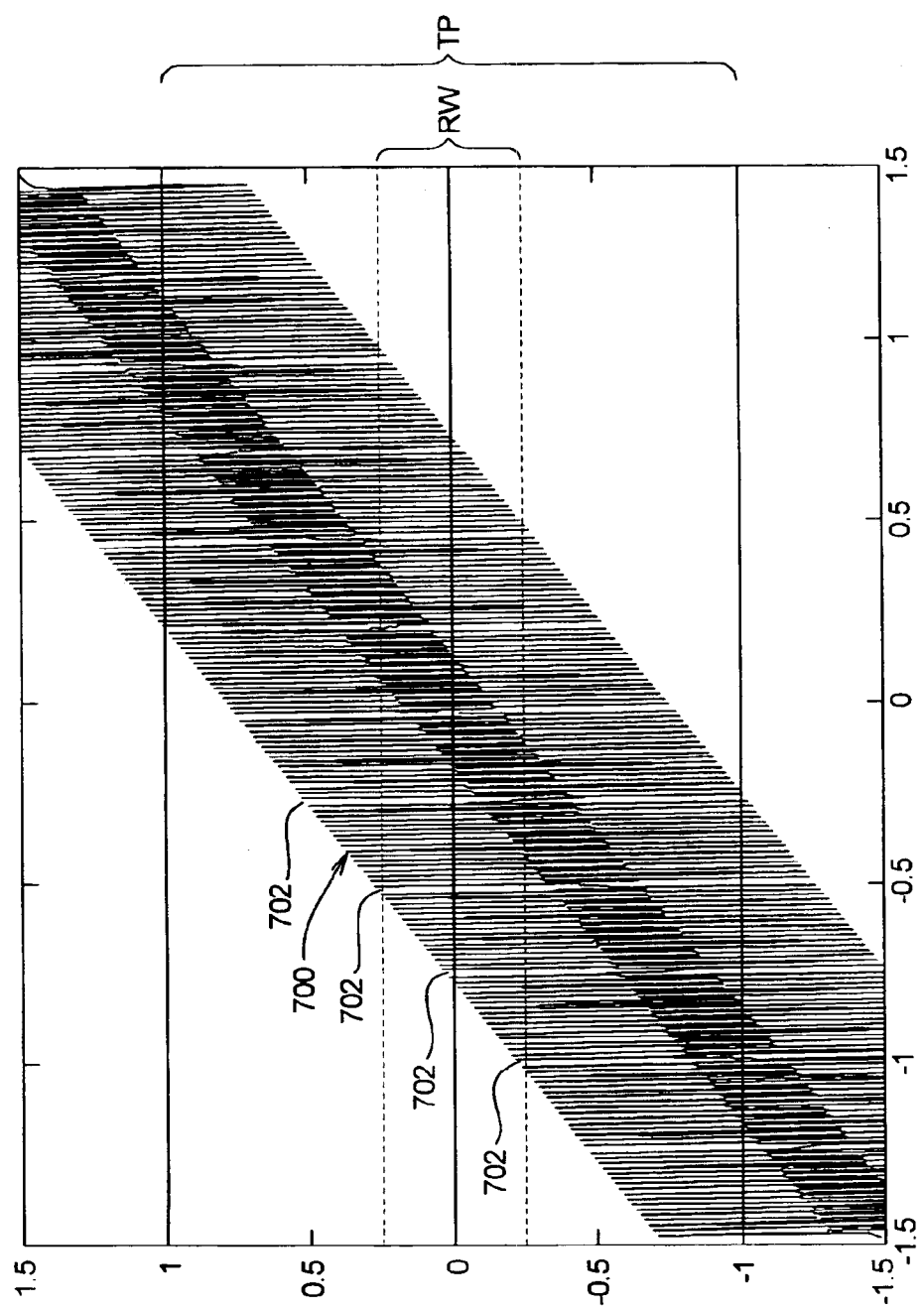
FIG. 7 is a diagrammatic representation of a magnified portion of one of the spirals of servo information shown in FIG. 6.
Figure 8:
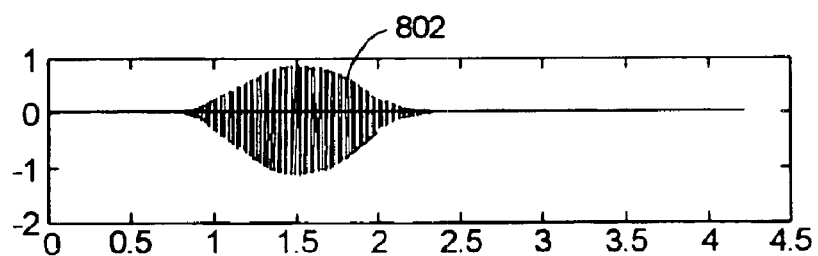
FIG. 8 is a diagrammatic representation of a read signal that is generated as the reader reads a portion of a spiral of servo information while the disk is spinning.
Figure 9:
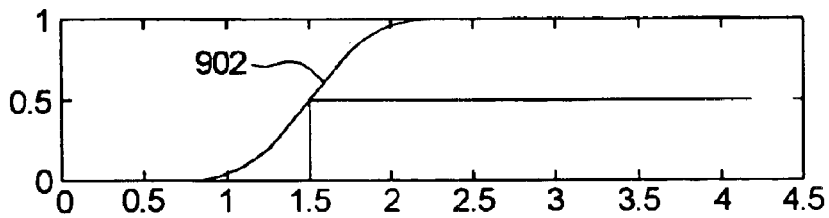
FIG. 9 is a diagrammatic representation of an integration curve in normalized units.
Figure 10:
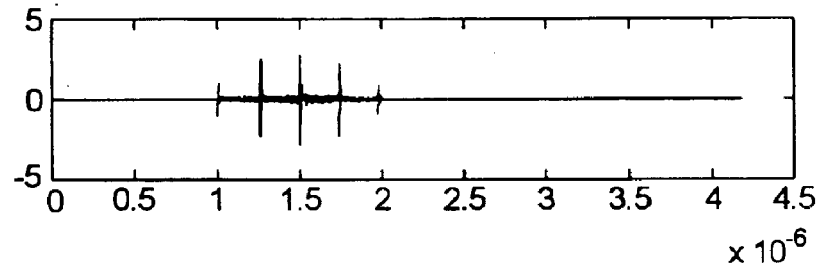
FIG. 10 is a diagrammatic representation illustrating five (5) sync marks in a read signal envelope.
Figure 11:
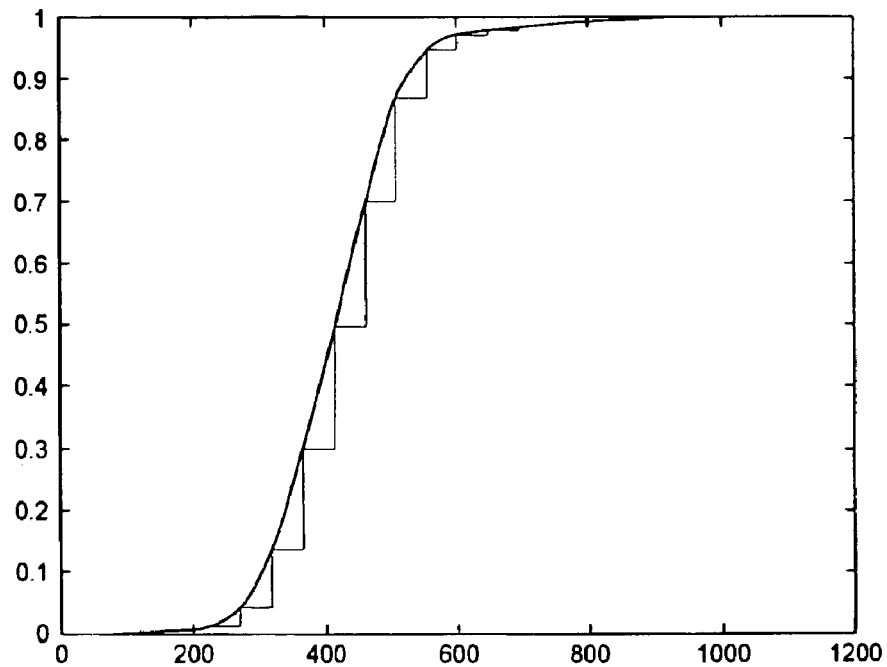
FIG. 11 is a diagrammatic representation of exemplary saved integrator values.
Figure 12:
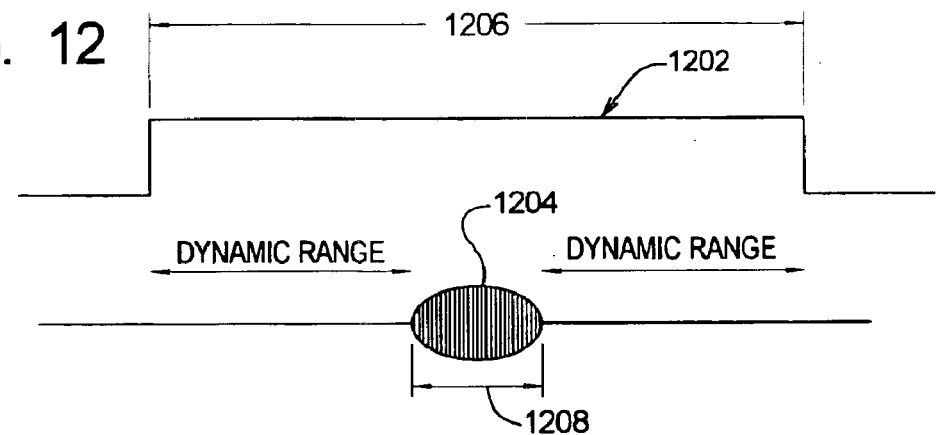
FIG. 12 is a schematic representation of an integration window and a read signal envelope, wherein the read signal envelope is centered in the integration window.
Figure 13:
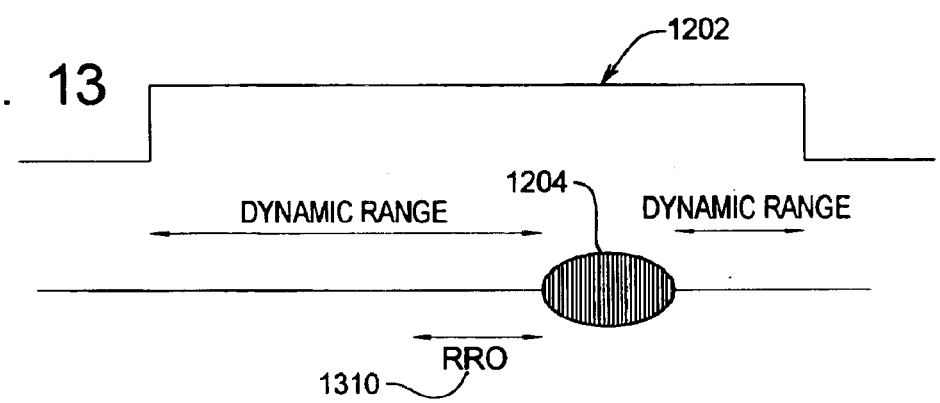
FIG. 13 is a schematic diagram illustrating an integration window and a read signal envelope, wherein the read signal envelope is shifted from the center of the integration window due to RRO.
Figure 14A:
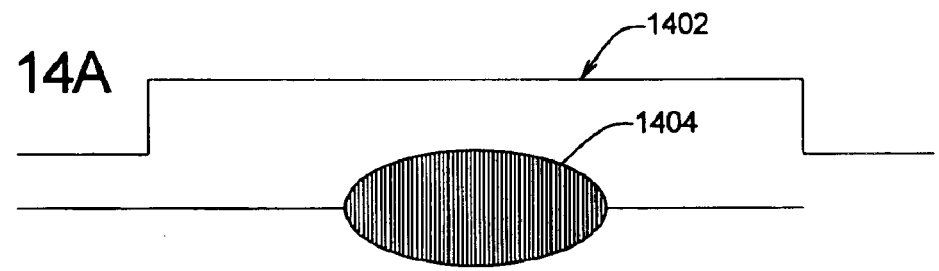
FIG. 14A is a schematic diagram illustrating a read signal envelope that is centered in an integration window.
Figure 14B:
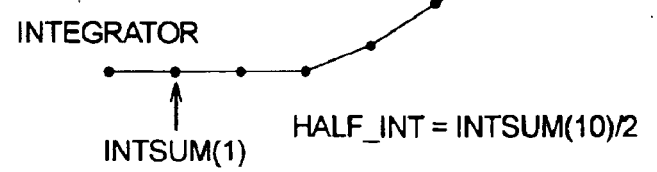
FIG. 14B is a schematic diagram illustrating a curve representing accumulated integration values across the integration window of FIG. 14A.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention allows the dynamic range of the system to be increased when determining a reference position for a read head, without increasing the noise in the system. This is accomplished by integrating over a first window, determining a position of the read signal envelope in the first window, and then using a second window, which is included within and smaller than the first integration window, to determine the reference position for the read head.

Figure 16:
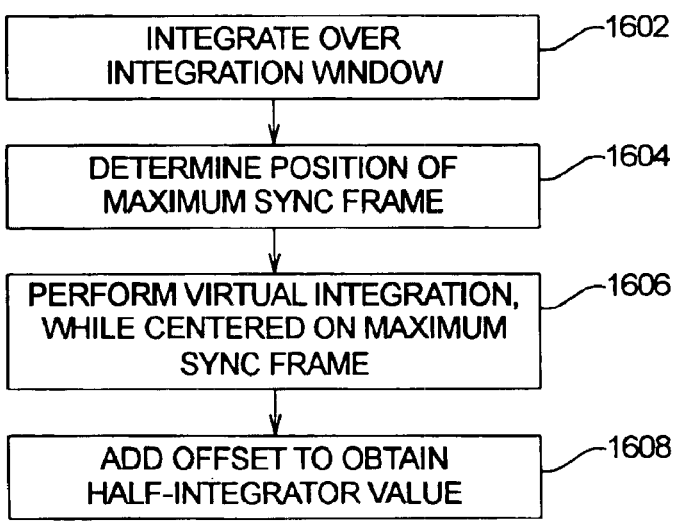
FIG. 16 is flowchart illustrating one embodiment of the present invention.
Figure 17A:
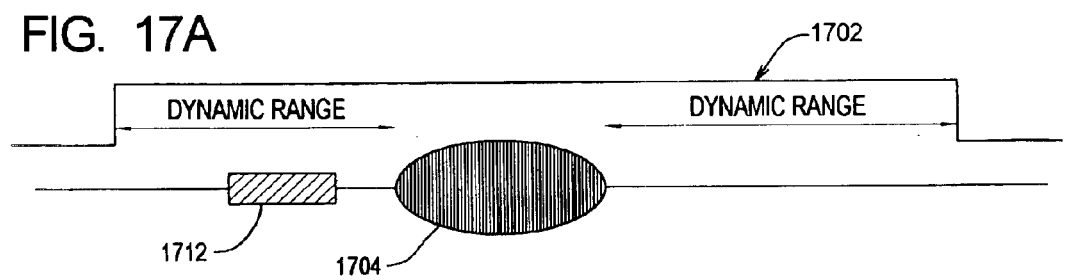
FIG. 17A is a schematic diagram illustrating a read signal envelope that is centered in a first integration window having a dynamic range that is larger than that of the prior art; and, FIG. 17B is a schematic diagram illustrating a curve representing accumulated integration values across the integration window of FIG. 17A, where more noise is present in a left-half of the integration window than the right-half of the integration window, and a second integration window (virtual integration window) used to accommodate for the noise.
Figure 17B:
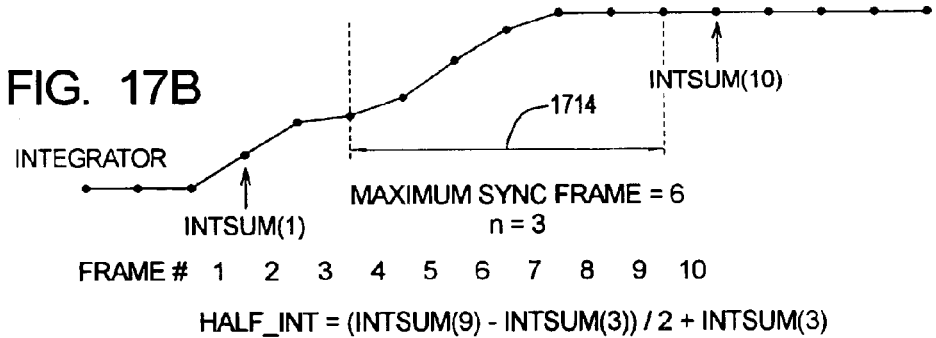

FIG. 16 is a flowchart illustrating one embodiment of the present invention. FIGS. 17A and 17B will also be used in conjunction with FIG. 16 to illustrate one embodiment of the present invention.

Figure 15A:
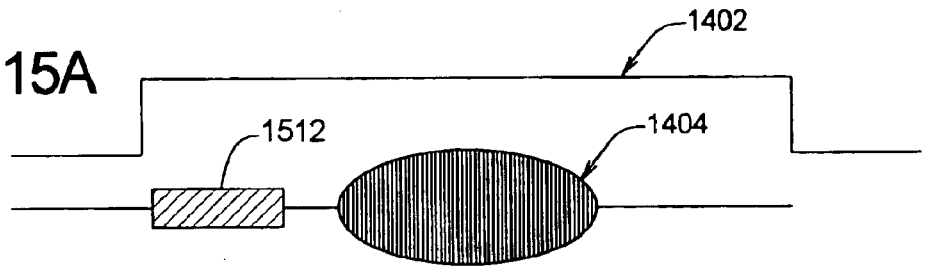
FIG. 15A is schematic diagram illustrating a read signal envelope that is centered in an integration window.
Figure 15B:
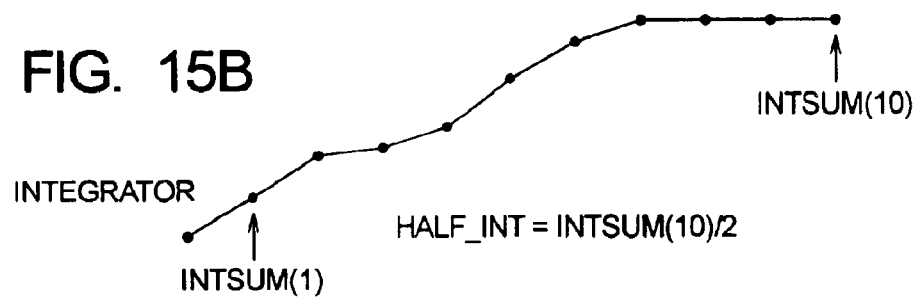
FIG. 15B is a schematic diagram illustrating a curve representing accumulated integration values across the integration window of FIG. 15A, where more noise is present in a left-half of the integration window than the right-half of the integration window.

FIG. 17A is a schematic illustration of an integration window 1702, a read signal envelope 1704, and noise 1712. The integration window of FIG. 17A is larger than prior integration windows (e.g., the integration window of FIG. 15A).

In one embodiment, the first integration window is 16 frames. However, other sizes of the first integration window are possible and anticipated. In some embodiments, the size of the first integration window may depend upon the size of a hardware register array.

With reference to FIGS. 16, 17A and 17B, after a read signal envelope is read within the integration window 1702, an integration is performed over the integration window 1702 on a frame-by-frame basis (step 1602). Next, a determination is made as to the frame in which the largest portion of the read signal envelope 1704 was contained. That is, a determination is made as to the frame containing the maximum sync mark. This is known as the maximum sync frame (step 1604).

Next, a second integration window 1714 (also known as a virtual integration window) is centered on the maximum sync frame and an integration is performed using +/−n frames about the maximum sync frame (step 1606). For example, with reference to FIGS. 17A and 17B, the maximum sync frame is frame number 6 and n=3. Therefore, the second integration window 1714 is centered on sync frame 6 and an integration is performed using +/−3 frames about frame 6 (i.e., frames 9 and 3). This value is divided by 2 to provide the half-integration value associated with the second integration window 1714.

Next, the half-integration value associated with the second integration window 1714 must be translated, so that it is associated with the first integration window 1702. Accordingly, the accumulated integrated value (offset) associated with the maximum sync frame minus n (in the example, the accumulated integration value associated with sync frame 3) is added to the half-integration value associated with the second integration window 1714 to yield the final half-integrator value (step 1608) and, hence, the reference position of the read head.

The final half-integration value may be expressed according to the following equation:

$$\text{Half\_Int} = \frac{\text{IntSum}(MaxSyncFrame + n) - \text{IntSum}(MaxSyncFrame - n)}{2} + \text{IntSum}(MaxSyncFrame - n)$$

The second integration window 1714 will automatically "move" with the read signal envelope 1704 in the first integration window 1702. As described above, in one embodiment, this is accomplished by, first, locating the maximum sync mark and, then, centering the second integration window 1714 about the maximum sync frame. Accordingly, the second integration window 1714 will be focused around the read signal envelope. Because the second integration window 1714 is smaller than the first integration window 1702, less noise will be integrated when determining the reference position of the read head.

The inventors of the present invention recognize that there are several alternatives in determining where to center the second integration window. For example, instead of locating the maximum sync mark, the center of the second integration window may be determined by integrating over the first integration window (including the noise) and then determining the half-integrator value associated with the first integration window, which will give a good approximation of the center of the read signal envelope. Then, the second integration window could be used as described above.

As another alternative to determining where to center the second integration window, an integration is performed over the first integration window and integration values are accumulated. When the accumulated integration value reaches a predetermined threshold, the frame at which the threshold was exceeded (or some related frame, e.g., the previous frame or the next frame) is selected as the frame where the second integration window should be centered. The threshold values may be selected using an iterative technique.

In the above-described example, when the integration is performed, the values are merely accumulated. Instead of accumulating values, an integration may be performed over each frame and a differential value may be stored relative to each frame (i.e., how much energy was there within each frame). The advantage of storing differential values is that, if the integration window is very large, then the size of the accumulated sum may become large. Accordingly, the number of register bits or adder bits becomes large, which can be more expensive. By using incremental or differential values, the largest value is bounded by the maximum possible integration value in a frame. It is less costly to provide many frames.

As an alternative embodiment which may be considered opposite to the embodiment described in connection with FIGS. 16, 17A and 17B, an assumption may be made that the read signal envelope is in the middle of the first integration window. The second integration window would then be centered relative to the center of the first integration window. If the value of the accumulated integration value over the second integration window was less than a predetermined threshold, then the virtual integration window could be opened-up further (i.e., the value of n could be increased).

It should be understood that the second integration window (virtual integration window) is preferably based entirely in software. It should also be understood that the first integration window is preferably based entirely in hardware or firmware.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface and a read head associated with the disk surface, said disk surface having spirals of servo information written thereon;
   detecting whether the read head has read spiral servo information within a first window of time;
   determining a reference position of the read head by integrating the detected spiral servo information within a second window of time that is smaller than the first window of time.

2. The method of claim 1 wherein use of the second window reduces noise relative to using only the first window.

3. The method of claim 1 wherein the detected spiral servo information includes sync marks and wherein said second window has a center position which is determined by locating one of the sync marks.

4. The method of claim 3 wherein the located sync mark has a value that is greater than all other sync marks in the detected spiral servo information.

5. The method of claim 1 wherein said second window has a center position that is determined by integrating over the first window to obtain accumulated integration values and dividing the accumulated integration values by two.

6. The method of claim 1 wherein said second window has a center position that is determined by integrating over the first window to obtain accumulated integration values and determining the location at which the accumulated integration values exceed a predetermined threshold.

7. A method comprising the steps of:
   providing a disk surface having spirals of servo information written thereon and a read head for reading said spirals of servo information, wherein a read signal envelope is generated when the read head reads a spiral of servo information;
   integrating over a first integration window, said first integration window including a read signal envelope;
   determining a reference position for said read head using a second integration window that is included within, and smaller than, said first integration window.

8. The method of claim 7 wherein the step of integrating includes integrating on a frame-by-frame basis.

9. The method of claim 8 wherein a frame is equal to a sync-to-sync interval in said spiral of servo information.

10. The method of claim 8 wherein the integrated frames are accumulated.

11. The method of claim 8 including the step of:
    determining which frame in the first integration window has a maximum sync amplitude.

12. The method of claim 11 wherein the maximum sync amplitude is used to center the second integration window.

13. The method of claim 12 wherein the second integration window uses 2n integration values in determining the reference position of the read head, where n is a natural number.

14. The method of claim 13 wherein the integration values of the second integration window are a subset of the integration values computed when integrating over the first window.

15. The method of claim 13 wherein the reference position of the read head is given by:

$$\text{Half\_Int} = \frac{\text{IntSum}(\text{MaxSyncFrame} + n) - \text{IntSum}(\text{MaxSyncFrame} - n)}{2} + \text{IntSum}(\text{MaxSyncFrame} - n)$$

where Half_Int represents the reference position of the read head, where MaxSyncFrame is the frame with the maximum value, and where IntSum(x) is the accumulated sum of integration values from the first frame of the first integration window to the $x^{th}$ frame of the first integration window.

16. The method of claim 7 wherein said second window has a center position that is determined by integrating over the first window to obtain accumulated integration values and dividing the accumulated integration values by two.

17. The method of claim 7 wherein said second window has a center position that is determined by integrating over the first window to obtain accumulated integration values and determining the location at which the accumulated integration values exceed a predetermined threshold.

18. A method comprising the steps of:
    providing a disk surface having spirals of servo information written thereon and a read head for reading said spirals of servo information, wherein a read signal envelope is generated when the read head reads a spiral of servo information;
    integrating over a first integration window, said first integration window including a read signal envelope;
    determining a reference position for said read head using a second integration window that is included within, and smaller than, said first integration window, wherein said first integration window has a center and the second integration has a center and wherein the center of said second integration window is in common with the center of the first integration window.

19. The method of claim 18 wherein the step of integrating includes integrating on a frame-by-frame basis.

20. The method of claim 19 wherein integrated frames have values that are accumulated over the second integration window and compared to a predetermined threshold, wherein the second integration window is opened if the accumulated values are less than the predetermined threshold.

21. An apparatus comprising:
    a disk surface having spiral servo information written thereon;
    a read head associated with the disk surface, wherein said read head is used to read said spiral servo information and wherein said read head generates a read signal envelope when reading said spiral servo information;
    circuitry for integrating over a first integration window, said first integration window including a read signal envelope;
    circuitry for determining a reference position for said read head using a second integration window that is included within, and smaller than, said first integration window.

22. The apparatus of claim 21 wherein said circuitry for integrating over the first integration window integrates on a frame-by-frame basis.

23. The apparatus of claim 22 wherein a frame is equal to a sync-to-sync interval in said spiral of servo information.

24. The apparatus of claim 22 wherein the integrated frames are accumulated.

25. The apparatus of claim 22 including: circuitry for determining which frame in the first integration window has a maximum sync amplitude.

26. The apparatus of claim 25 wherein the maximum sync amplitude is used to center the second integration window.

27. The apparatus of claim 26 wherein the second integration window uses 2n integration values in determining the reference position of the read head, where n is a natural number.

28. The apparatus of claim 27 wherein the integration values of the second integration window are a subset of the integration values computed when integrating over the first window.

29. The apparatus of claim 27 wherein the reference position of the read head is given by:

$$\text{Half\_Int} = \frac{IntSum(MaxSyncFrame + n) - IntSum(MaxSyncFrame - n)}{2} + IntSum(MaxSyncFrame - n)$$

where Half_Int represents the reference position of the read head, where MaxSyncFrame is the frame with the maximum value, and where IntSum(x) is the accumulated sum of integration values from the first frame of the first integration window to the $x^{th}$ frame of the first integration window.

30. The apparatus of claim 21 wherein said second window has a center position that is determined by integrating over the first window to obtain accumulated integration values and dividing the accumulated integration values by two.

31. The apparatus of claim 21 wherein said second window has a center position that is determined by integrating over the first window to obtain accumulated integration values and determining the location at which the accumulated integration values exceed a predetermined threshold.

* * * * *